United States Patent
Hoshi et al.

(10) Patent No.: US 12,202,466 B2
(45) Date of Patent: Jan. 21, 2025

(54) CONTROL METHOD FOR HYBRID VEHICLE AND CONTROL DEVICE FOR HYBRID VEHICLE

(71) Applicant: NISSAN MOTOR CO., LTD., Yokohama (JP)

(72) Inventors: Kiyoshi Hoshi, Kanagawa (JP); Kenichi Gotou, Kanagawa (JP); Azusa Kobayashi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 242 days.

(21) Appl. No.: 17/629,868

(22) PCT Filed: Jul. 26, 2019

(86) PCT No.: PCT/JP2019/029497
§ 371 (c)(1),
(2) Date: Jan. 25, 2022

(87) PCT Pub. No.: WO2021/019617
PCT Pub. Date: Feb. 4, 2021

(65) Prior Publication Data
US 2022/0289170 A1    Sep. 15, 2022

(51) Int. Cl.
*B60W 20/16*    (2016.01)
*B60W 10/06*    (2006.01)
*B60W 10/26*    (2006.01)

(52) U.S. Cl.
CPC ............ *B60W 20/16* (2016.01); *B60W 10/06* (2013.01); *B60W 10/26* (2013.01);
(Continued)

(58) Field of Classification Search
CPC ...... B60W 20/16; B60W 10/06; B60W 10/26; B60W 2510/244; B60W 2530/12;
(Continued)

(56) References Cited

U.S. PATENT DOCUMENTS

| | | | |
|---|---|---|---|
| 2002/0157883 A1 | 10/2002 | Ogata et al. | |
| 2008/0196395 A1* | 8/2008 | Hashizume | F01N 9/002 60/286 |
| 2010/0004844 A1 | 1/2010 | Hirooka | |
| 2012/0036847 A1 | 2/2012 | Schreiber et al. | |
| 2017/0022916 A1 | 1/2017 | Hirai et al. | |
| 2018/0149063 A1 | 5/2018 | Oshiumi et al. | |
| 2019/0023261 A1* | 1/2019 | Kanayama | B60K 6/48 |

(Continued)

FOREIGN PATENT DOCUMENTS

| | | |
|---|---|---|
| EP | 2 097 637 B1 | 1/2017 |
| JP | 2002-242721 A | 8/2002 |

(Continued)

*Primary Examiner* — Yi-Kai Wang
(74) *Attorney, Agent, or Firm* — Foley & Lardner LLP

(57) ABSTRACT

A control method for a hybrid vehicle is provided. The hybrid vehicle includes: a generator configured to charge a battery by using power of an engine; an electric motor configured to drive a driving wheel by electric power of the battery; and a particulate filter configured to collect particulate matter contained in exhaust gas from the engine. In the control method, the engine is driven to raise a temperature of the particulate filter when a first temperature rise condition is satisfied in which a first predetermined amount or more of the particulate matter is accumulated in the particulate filter and the temperature of the particulate filter is equal to or lower than a predetermined temperature. Drive of the engine is prohibited, when a predetermined first condition that a driver does not intend to drive the engine is satisfied.

7 Claims, 7 Drawing Sheets

(52) U.S. Cl.
CPC ............ *B60W 2510/244* (2013.01); *B60W 2530/12* (2013.01); *B60W 2710/0694* (2013.01)

(58) Field of Classification Search
CPC ......... B60W 2710/0694; B60W 20/20; B60W 2510/0604; B60W 2510/0638; B60W 2510/0657; B60W 2710/0605; B60W 2710/0644; B60W 2710/0666; B60W 2710/083; B60W 20/13; B60W 30/184; B60W 30/1843; B60W 30/1846; B60W 30/1882; F01N 9/002; F01N 2900/1606; F01N 30/23; F02D 29/02; F02D 41/0245; F02D 41/029; F02D 2200/0812; F02D 2200/501; F02D 2200/503; B60Y 2300/472; B60Y 2300/474; B60Y 2300/476; Y02T 10/62; B60K 6/46
USPC .......................................................... 701/22
See application file for complete search history.

(56) References Cited

U.S. PATENT DOCUMENTS

| | | |
|---|---|---|
| 2019/0168735 A1 | 6/2019 | Morisaki |
| 2021/0155218 A1 | 5/2021 | Higuchi et al. |
| 2022/0082039 A1* | 3/2022 | Ishii .................. B01D 46/0086 |

FOREIGN PATENT DOCUMENTS

| | | | |
|---|---|---|---|
| JP | 2005248833 A | * | 9/2005 |
| JP | 2007-055348 A | | 3/2007 |
| JP | 2008-163848 A | | 7/2008 |
| JP | 2011-032890 A | | 2/2011 |
| JP | 2011-085092 A | | 4/2011 |
| JP | 2015-105045 A | | 6/2015 |
| JP | 2015-202832 A | | 11/2015 |
| JP | 2017-141775 A | | 8/2017 |
| JP | 2018-083592 A | | 5/2018 |
| WO | WO 01/83967 A1 | | 11/2001 |
| WO | WO 2015/159218 A2 | | 10/2015 |
| WO | WO 2019/116586 A1 | | 6/2019 |

* cited by examiner

CONTROL METHOD FOR HYBRID VEHICLE AND CONTROL DEVICE FOR HYBRID VEHICLE

TECHNICAL FIELD

The present invention relates to a control method for a hybrid vehicle and a control device for a hybrid vehicle.

BACKGROUND ART

A so-called series hybrid vehicle that uses an engine for power generation is equipped with a filter (Gasoline Particulate Filter: GPF) for collecting particulate matter (PM) contained in exhaust gas of the engine. When the PM accumulates on this GPF, clogging may occur, and therefore, it is necessary to burn the PM accumulated in the GPF at an appropriate timing to regenerate the GPF.

JP2015-202832A discloses a control device for an engine that drives an engine to raise a temperature of a filter when a predetermined amount or more of PM is accumulated in the filter for collecting the PM, and supplies air by motoring (idling of the engine) to burn the PM to regenerate the filter, after the temperature is raised.

SUMMARY OF INVENTION

In the series hybrid vehicles, when power amount of a battery becomes low, the engine is driven to charge the battery by a generator, and a driving sound of the engine is louder than a driving sound of the motor. Therefore, when the engine is driven to regenerate the GPF, if the timing is not intended by the driver, the comfort of the driver may be impaired by a vibration noise caused by the engine drive.

Therefore, in view of the above-mentioned problem, an object of the invention is to provide a control method for the hybrid vehicle in which the GPF can be regenerated without impairing the comfort of the driver.

According to one embodiment of present invention, control method for a hybrid vehicle is provided. The hybrid vehicle includes: a generator configured to charge a battery by using power of an engine; an electric motor configured to drive a driving wheel by electric power of the battery; and a particulate filter configured to collect particulate matter contained in exhaust gas from the engine. In the control method, the engine is driven to raise a temperature of the particulate filter when a first temperature rise condition is satisfied in which a first predetermined amount or more of the particulate matter is accumulated in the particulate filter and the temperature of the particulate filter is equal to or lower than a predetermined temperature. Drive of the engine is prohibited when a predetermined first condition that a driver does not intend to drive the engine is satisfied.

DESCRIPTION OF EMBODIMENTS

First Embodiment

Hereinafter, a hybrid vehicle 100 according to a first embodiment of the invention will be described with reference to the drawings and the like.

Figure 1:
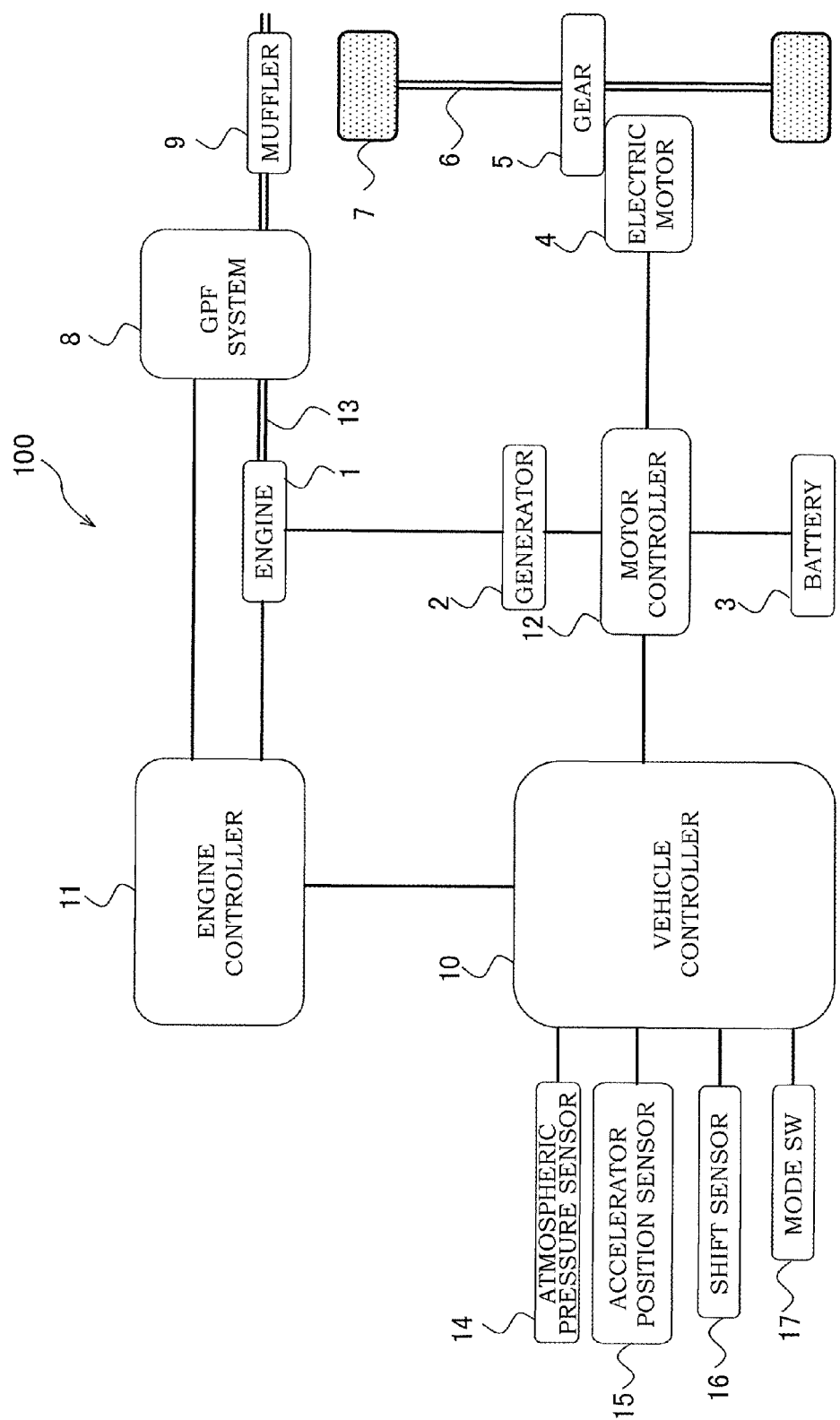
FIG. 1 is a schematic configuration diagram illustrating a main configuration of a hybrid vehicle according to a first embodiment.

FIG. 1 is a schematic configuration diagram illustrating a main configuration of the hybrid vehicle 100 according to the first embodiment.

As shown in FIG. 1, the hybrid vehicle 100 includes an engine 1, a generator 2, a battery 3, an electric motor 4, a gear 5, an axle 6, driving wheels 7, a GPF system 8, and a muffler 9. Further, the hybrid vehicle 100 includes an engine controller 11 which controls the engine 1, a motor controller 12 which controls a driving system, and a vehicle controller 10 which controls the entire hybrid vehicle 100.

The hybrid vehicle 100 is a so-called series hybrid vehicle that drives the generator 2 by using the power of the engine 1, supplies electric power generated by the generator 2 to the battery 3, and rotates the electric motor 4 with the electric power of the battery 3 to drive the driving wheels 7. Therefore, in the hybrid vehicle 100, the power of the engine 1 is basically used not as a power source for driving the vehicle but as an electric power generation source for causing the generator 2 to generate electric power. When driving force requirements of the electric motor 4 cannot be satisfied only by the electric power of the battery 3, the electric power generated by the engine 1 is directly supplied to the electric motor 4 in addition to the electric power of the battery 3.

The engine 1 is mechanically connected to the generator 2 via a speed reducer (not illustrated). The driving force of the engine 1 is transmitted to the generator 2, and the generator 2 generates electric power for charging the battery 3 by the driving force of the engine 1. Further, the generator 2 is rotated by the electric power of the battery 3 as needed to drive an output shaft of the engine 1. That is, the generator 2 has a function as a motor generator. The operation of the engine 1 is controlled by the engine controller 11, and the operation of the generator 2 is controlled by the motor controller 12.

An exhaust passage 13 is connected to the engine 1, and the exhaust passage 13 is provided with the GPF system 8 and the muffler 9 from the upstream side in order. The GPF system 8 is provided with a gasoline particulate filter (GPF) 81 (see FIG. 2) that collects a particulate matter (PM) in the exhaust gas of the engine 1. The operation of the GPF system 8 is controlled by the engine controller 11. The muffler 9 is provided on a downstream side of the GPF system 8 to reduce exhaust noises and discharge the exhaust gas to the outside. The details of the exhaust system of the engine 1 will be described later.

The engine controller 11 is electrically connected to the engine 1 and the GPF system 8, and is also electrically connected to the vehicle controller 10 which controls the entire hybrid vehicle 100. The engine controller 11 transmits information on the engine 1 and the GPF system 8 to the vehicle controller 10 as a signal, receives a command regarding the operation of the engine 1 transmitted from the vehicle controller 10, and controls the engine 1 according to the command. The engine controller 11 controls, for example, a throttle position of the engine 1, ignition timing by a spark plug, a fuel injection amount from an injector, and the like in response to the command from the vehicle controller 10.

The battery 3 is electrically connected to the generator 2 and the electric motor 4 via the motor controller 12. The battery 3 is charged with the electric power generated by the generator 2 and the regenerative electric power of the electric motor 4, and supplies the charged electric power to the electric motor 4.

The electric motor 4 is mechanically connected to the axle 6 via the gear 5, and the axle 6 is mechanically connected to the driving wheels 7. The electric motor 4 is rotated by the electric power supplied from the battery 3, and the driving force of the electric motor 4 is transmitted to the driving wheel 7 via the gear 5 and the axle 6. The driving wheel 7 is driven by the driving force of the electric motor 4, so that the hybrid vehicle 100 runs.

The motor controller 12 is electrically connected to the generator 2, the battery 3, the electric motor 4, and the like which constitute the driving system of the hybrid vehicle 100, and is also electrically connected to the vehicle controller 10 which controls the entire hybrid vehicle 100. The motor controller 12 transmits information on the driving system to the vehicle controller 10 as a signal, receives a command regarding the operation of the driving system transmitted from the vehicle controller 10, and controls the operation of the driving system including the generator 2, the battery 3, and the electric motor 4 based on the command.

The vehicle controller 10 is electrically connected to an atmospheric pressure sensor 14, an accelerator position sensor 15, a shift sensor 16, a mode switch 17, and the like. The vehicle controller 10 is electrically connected to the engine controller 11 which controls the operation of the engine 1 and the motor controller 12 which controls the operation of the driving system.

The atmospheric pressure sensor 14 detects an atmospheric pressure outside the vehicle. The accelerator position sensor 15 detects an operation amount (accelerator position) of an accelerator pedal. The shift sensor 16 detects the position of a shift lever.

The mode switch 17 is a switch that switches running modes of the hybrid vehicle 100, and the running modes include a normal mode and an EV priority running mode (manner mode). In the normal mode, the battery 3 is charged with the regenerative electric power of the electric motor 4, and the battery 3 is charged by driving the engine 1 to cause the generator 2 to generate electric power as necessary. In the EV priority running mode, the engine 1 is not driven and the battery 3 is not charged by the generator 2. The EV priority running mode is suitable for running in a residential district or the like because the electric power generation by the engine 1 is not performed and an engine sound is not generated. The running mode may include an eco-mode in which the vehicle can be started and stopped only by operating the accelerator by generating a regenerative torque greater than that in the normal mode when the accelerator is released, or a charge mode in which the electric power generation of the generator 2 by the driving force of the engine 1 is preferentially performed to increase a charging amount of the battery 3.

Information detected by each sensor, information of set running mode, and information from the engine controller 11 and the motor controller 12 are transmitted to the vehicle controller 10 as signals.

The vehicle controller 10 includes a general-purpose electronic circuit including a microcomputer, a microprocessor, and a CPU and peripheral devices, and executes a process for controlling the hybrid vehicle 100 by executing a specific program. The vehicle controller 10 sends commands to the engine controller 11 and the motor controller 12 based on, for example, information on the sensors, the running modes, the engine 1 and the GPF system 8, and information on the driving system, and performs engine control based on the GPF temperature and the PM accumulation amount, which will be described later.

Figure 2:
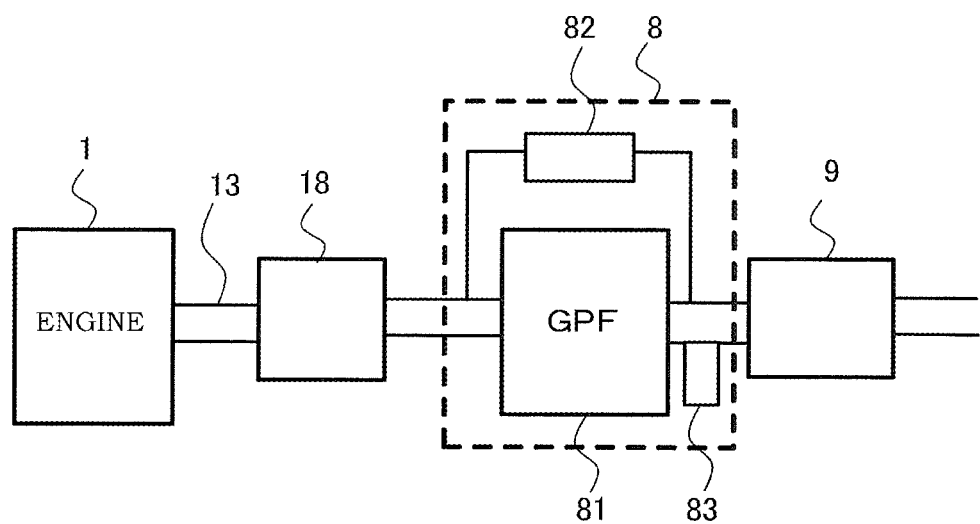
FIG. 2 is a schematic configuration diagram illustrating a main configuration of an exhaust system.

FIG. 2 is a schematic configuration diagram illustrating a main configuration of an exhaust system of the hybrid vehicle 100. As shown in FIG. 2, the exhaust passage 13 through which the exhaust gas discharged from the engine 1 flows is connected to the engine 1. In the exhaust passage 13, a catalyst converter 18, the GPF system 8, and the muffler 9 are arranged in order from the upstream side of the exhaust gas.

The catalyst converter 18 incorporates an exhaust gas purification catalyst such as a three-way catalyst and is arranged on the upstream side of the GPF system 8. The catalyst converter 18 purifies the exhaust gas by oxidizing unburned components such as HC and CO contained in the exhaust gas of the engine 1 and reducing oxidation components such as NOx. The catalyst converter may be further arranged on the downstream side of the GPF system 8.

The GPF system 8 includes the gasoline particulate filter (GPF) 81, a differential pressure sensor 82 that detects a differential pressure Pdif between pressures in the upstream side and the downstream side of the GPF 81, and a GPF temperature sensor 83 that detects a temperature T of the GPF 81. The GPF system 8 is connected to the engine 1 via an exhaust passage 13. The GPF system 8 is also electrically connected to the engine controller 11.

The GPF 81 is a filter that collects the particulate matter (PM) in the exhaust gas of the engine 1. The differential pressure sensor 82 detects the differential pressure Pdif between the exhaust gas pressure at an inlet of the GPF 81 and the exhaust gas pressure at an outlet of the GPF 81. The detected differential pressure Pdif is transmitted as a signal to the vehicle controller 10 via the engine controller 11. The vehicle controller 10 estimates the PM accumulation amount S of the GPF 81 based on the differential pressure Pdif.

The GPF temperature sensor 83 is provided in the exhaust passage 13 at a portion connected to the outlet of the GPF 81, and detects the GPF temperature T which is a bed temperature of the GPF. The detected GPF temperature T is transmitted as a signal to the vehicle controller 10 via the engine controller 11. An exhaust temperature sensor for detecting the exhaust gas temperature of the engine 1 may be further provided in the exhaust passage 13 on the upstream side of the GPF 81.

The muffler 9 is provided on the downstream side of the GPF system 8 and reduces exhaust noises of the passing exhaust gas.

With the above-mentioned configuration, the exhaust gas from the engine 1 flows through the exhaust passage 13, is purified by the catalyst converter 18, and is discharged to the outside from the muffler 9 after the PM is removed by the GPF 81.

Figure 3:
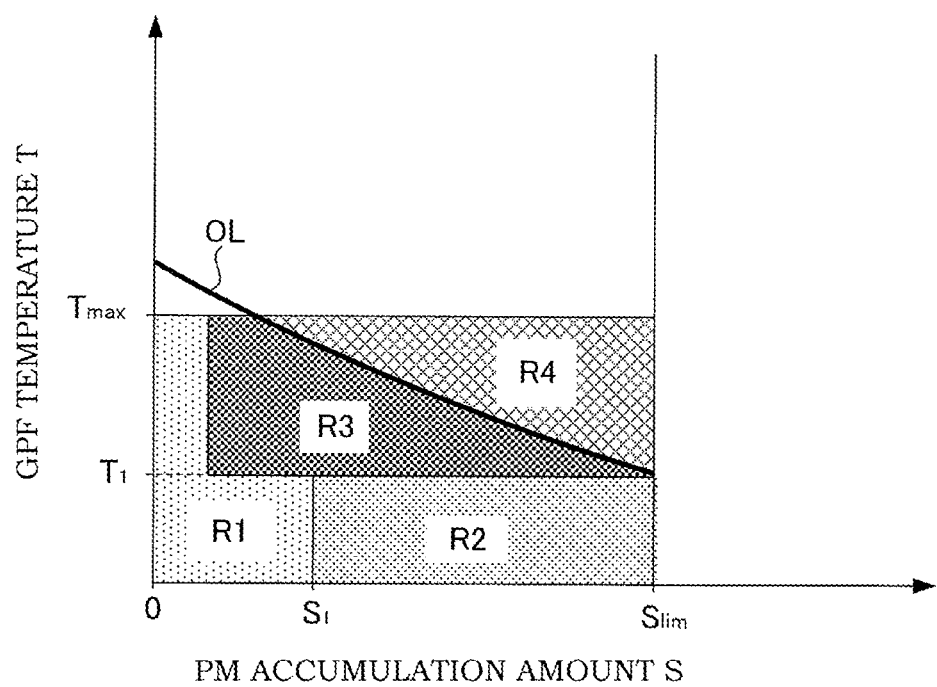
FIG. 3 is a graph illustrating a relation between a GPF temperature, a PM accumulation amount and engine operations.

FIG. 3 is a graph illustrating the relation between the GPF temperature, the PM accumulation amount and the engine operations. In FIG. 3, a region R1 is a normal operation region, a region R2 is a GPF temperature rise region, a region R3 is a motoring region, and a region R4 is a motoring prohibition region. The maximum GPF temperature Tmax is the GPF temperature T when the exhaust gas temperature of the engine 1 is the maximum temperature, and the GPF temperature T does not usually exceed the maximum GPF temperature Tmax. Therefore, the state point determined by the PM accumulation amount S and the GPF temperature T is not included in a region on the higher temperature side than the maximum GPF temperature Tmax.

In the normal operation region R1, since the PM accumulation amount S accumulated in the filter is small, the GPF regeneration is unnecessary. Therefore, the engine control for the regeneration is not performed, and the control of the hybrid vehicle 100 is performed in accordance with the set running mode.

When a predetermined amount $S_1$ (first predetermined amount) or more of PM has been accumulated in the GPF and a GPF temperature is equal to or lower than a predetermined temperature $T_1$ (hereinafter, referred to as "first temperature rise condition"), that is, in a GPF temperature rise region R2 where the first temperature rise condition is satisfied, the vehicle controller 10 is configured to drive the engine 1. When the engine 1 is driven, the exhaust gas temperature of the engine 1 rises and the temperature of the GPF 81 rises.

When the temperature of the GPF 81 rises to a temperature higher than the predetermined temperature $T_1$, the PM accumulated in the GPF 81 starts burning. In a motoring region R3 in which the GPF temperature T is higher than the predetermined temperature $T_1$, fuel injection of the engine 1 is stopped, and motoring is performed in which the output shaft of the engine 1 is driven forcedly by the generator 2. By the motoring, air is fed into the GPF 81 having a high temperature, the burning of the PM accumulated in the GPF 81 is promoted, and the GPF 81 is regenerated.

In this way, it is possible to regenerate the GPF 81 by raising the temperature of the GPF 81 by driving the engine 1 and promoting the burning of the PM accumulated in the GPF 81 by the motoring.

In a case where the PM accumulation amount S of the GPF 81 exceeds a limit allowable amount $S_{lim}$ for some reasons, the vehicle controller 10 gives a warning notification to the driver, such as going to a dealer, and prompts the driver to replace parts of the GPF 81.

Next, a curve OL in FIG. 3 represents an output limit curve. The output limit curve OL indicates a relation between the PM accumulation amount S and an allowable GPF temperature. The allowable GPF temperature is an upper limit value of the GPF temperature T according to the motoring of the engine 1, and is set according to the PM accumulation amount S as an upper limit value of the GPF temperature T at which burning the PM by the motoring of the engine 1 does not cause an excessive temperature rise of the GPF 81. As can be seen from the output limit curve OL, the allowable GPF temperature decreases as the PM accumulation amount S increases. The reason for this is that the greater the PM accumulation amount S is, the greater the temperature rise of GPF 81 during the motoring becomes.

In a case where the GPF temperature T exceeds the allowable GPF temperature, that is, in a region in a higher temperature side (motoring prohibition region R4) than the output limit curve OL in FIG. 3, when the motoring is performed, the temperature of the GPF 81 may excessively raise, which may bring about deterioration of the GPF 81. Therefore, in the case where the GPF temperature T exceeds the allowable GPF temperature (that is, in the region R4), the vehicle controller 10 stops the driving of the output shaft of the engine 1 due to the generator 2 and prohibits the motoring operation. In the motoring region R3, since the fuel injection of the engine 1 is stopped, the GPF temperature T does not rise due to the exhaust gas temperature of the engine, and a state point does not normally come to the region (motoring prohibition region R4) on the higher temperature side than the output limit curve OL.

Therefore, when the first temperature rise condition is satisfied (when a state point is in the region R2 of FIG. 3), the GPF 81 is regenerated by raising the temperature of the GPF 81 by driving the engine 1 and promoting the burning of the PM accumulated in the GPF 81 by the motoring. However, the driving sound of the engine 1 is greater than the driving sound of the electric motor 4. Therefore, for example, in a running mode in which the operation of the engine 1 is suppressed, such as a case where the EV priority running mode has been set, when the engine is driven at a timing not intended by the driver, the comfort of the driver may be impaired by the engine driving sound. Therefore, in the present embodiment, as in the engine control based on the GPF temperature and the PM accumulation amount described below, when a predetermined condition (first condition) that the driver does not intend to drive the engine 1 is satisfied, the drive of the engine 1 is prohibited even if the first temperature rise condition is satisfied.

Figure 4:
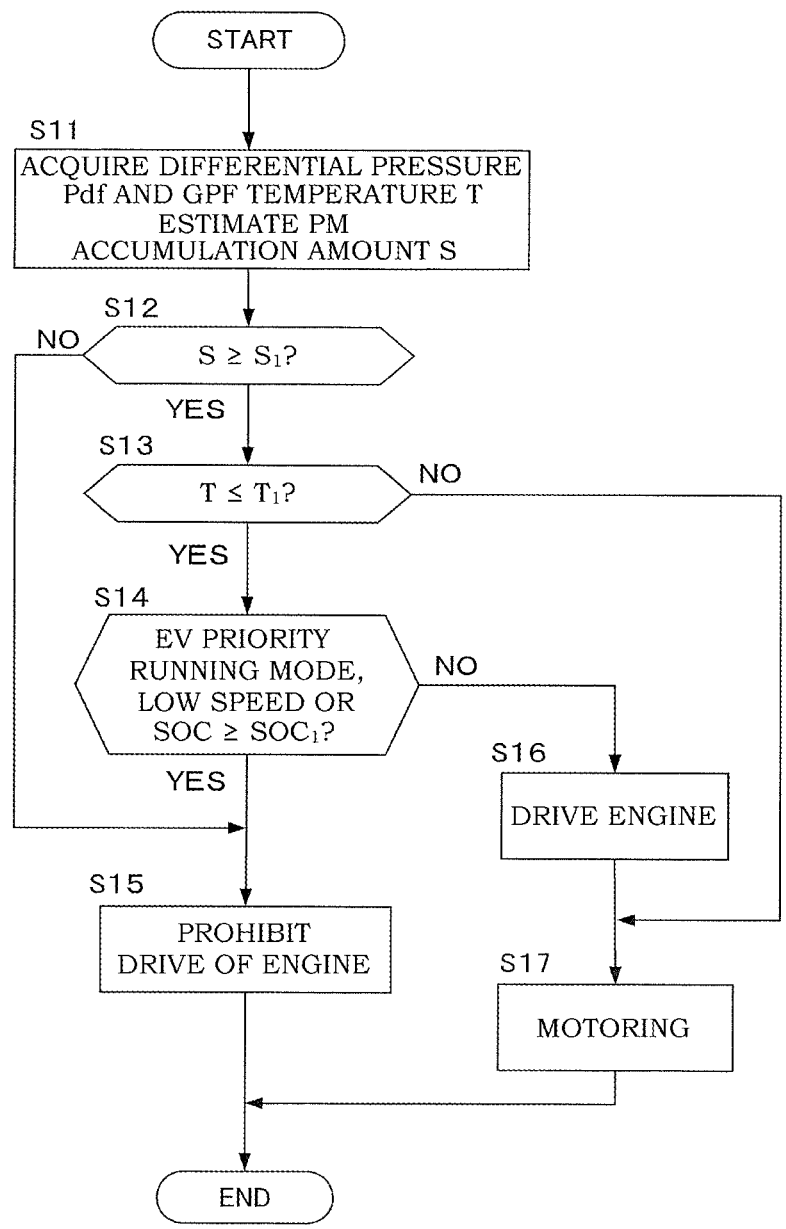
FIG. 4 is a flowchart illustrating engine control based on the GPF temperature and the PM accumulation amount in the first embodiment.

FIG. 4 is a flowchart illustrating engine control based on the GPF temperature and the PM accumulation amount in the hybrid vehicle 100 of the first embodiment. The following controls are all executed by the vehicle controller 10 at regular time intervals.

In step S11, the vehicle controller 10 receives the signal of the differential pressure Pdif and the signal of the GPF temperature T from the GPF system 8, and estimates the PM accumulation amount S of the GPF 81 based on the differential pressure Pdif.

In step S12, the vehicle controller 10 determines whether the PM accumulation amount S is equal to or greater than the first predetermined amount $S_1$. When the PM accumulation amount S is smaller than the first predetermined amount $S_1$, the GPF regeneration is unnecessary, and the vehicle controller 10 proceeds to the process of step S15, and ends the process of the engine control based on the GPF temperature and the PM accumulation amount without driving the engine 1.

On the other hand, when the PM accumulation amount S is equal to or greater than the first predetermined amount $S_1$, the vehicle controller 10 executes the process of step S13.

In step S13, the vehicle controller 10 determines whether the GPF temperature T is equal to or lower than the predetermined temperature $T_1$. When the GPF temperature T is equal to or lower than the predetermined temperature $T_1$, the first temperature rise condition (that is, the PM accumulation amount S is equal to or greater than the first predetermined amount $S_1$ and the GPF temperature T is equal to or lower than the predetermined temperature $T_1$) is satisfied. When the first temperature rise condition is satisfied, the vehicle controller 10 executes the process of step S14.

On the other hand, when the GPF temperature T is higher than the predetermined temperature $T_1$ in step S13, the temperature of the GPF 81 is sufficiently high and the state point is in the motoring region R3 of FIG. 3, and thus the vehicle controller 10 proceeds to the process of step S17 to perform the motoring. By the motoring, air is fed into the GPF 81 having a high temperature, the burning of the PM is promoted, and the GPF 81 is regenerated. When the GPF 81 is regenerated and the differential pressure Pdif becomes equal to or less than the predetermined value, the vehicle controller 10 ends the process of the engine control based on the GPF temperature and the PM accumulation amount.

When the first temperature rise condition is satisfied, in step S14, the vehicle controller 10 determines whether the predetermined first condition that the driver does not intend to drive the engine 1 is satisfied.

Specifically, the vehicle controller 10 determines that for example, the EV priority running mode has been set, the vehicle speed is equal to or lower than a predetermined speed, or the SOC of the battery 3 is higher than a predetermined value $SOC_1$, and the vehicle controller 10 determines that the first condition is satisfied if any of the above conditions is met. When the first condition is satisfied, the vehicle controller 10 proceeds to the process of step S15, prohibits the drive of the engine 1, and ends the process of the engine control based on the GPF temperature and the PM accumulation amount.

As described above, in the present embodiment, when the predetermined first condition that the driver does not intend to drive the engine 1 is satisfied, the drive of the engine 1 is prohibited even if the first temperature rise condition is satisfied. As a result, it prevents the comfort of the driver from being impaired due to driving the engine at an unintended timing. In other words, when the EV priority running mode has been set, when the vehicle speed is equal to or lower than the predetermined speed, or when the SOC of the battery 3 is higher than the predetermined value $SOC_1$, the drive of the engine 1 is prohibited. In the EV priority running mode, since the charging of the battery 3 by the engine 1 is limited, the driver does not intend to drive the engine 1. Therefore, when the engine 1 is driven at this timing, the comfort of the driver may be impaired due to a vibration noise caused by the drive of the engine. The driver is usually not intended to drive the engine 1 even during low speed driving. In particular, when the engine 1 is driven during the low speed driving, the engine driving sound is more noticeable to the driver, which may greatly impair the comfort of the driver. When the SOC of the battery 3 is large to some extent (greater than the predetermined value $SOC_1$), the driver does not intend to charge the battery 3, and thus does not intend to drive the engine 1. Therefore, when the engine 1 is driven against the intention of the driver in the case where the SOC is greater than the predetermined value, the comfort of the driver may be impaired. When electric power is generated by the engine 1 in the case where the SOC is large, an allowable charge capacity of the battery 3 may be exceeded. Therefore, it is preferable to prohibit the drive of the engine 1 from the viewpoint of battery protection.

The first condition is not limited to the above case, and in addition to the above-mentioned case, the first condition may include a case where a trouble in relation to the performance of other components occurs when the engine is driven at a timing not intended by the driver or is driven for the GPF regeneration.

When it is determined in step S14 that the predetermined first condition is not satisfied, the vehicle controller 10 executes the process of step S16.

In step S16, the vehicle controller 10 drives the engine 1 to raise the temperature of the GPF 81. When the temperature T of the GPF 81 becomes higher than the predetermined temperature $T_1$, the vehicle controller 10 performs the motoring in step S17. By the motoring, air is fed into the GPF 81 having a high temperature, the burning of the PM is promoted, and the GPF 81 is regenerated. When the GPF 81 is regenerated and the differential pressure Pdif becomes equal to or less than the predetermined value, the vehicle controller 10 ends the process of the engine control based on the GPF temperature and the PM accumulation amount.

Since the control is performed at regular time intervals, even if the predetermined first condition is once satisfied and the drive of the engine 1 is prohibited in the GPF temperature rise region R2 of FIG. 3, if the first condition is no longer satisfied after then, the vehicle controller 10 drives the engine 1 to raise the temperature of the GPF 81. Therefore, normally, the PM accumulation amount S of the GPF 81 does not exceed the limit allowable amount $S_{lim}$.

According to the hybrid vehicle 100 of the first embodiment described above, the following effects can be obtained.

The hybrid vehicle 100 drives the engine 1 to raise the temperature of the GPF 81 when the first temperature rise condition is satisfied in which the particulate matter (PM) of the first predetermined amount $S_1$ or more is accumulated on the GPF 81 (gasoline particulate filter) and the temperature T of the GPF 81 is the predetermined temperature $T_1$ or less. On the other hand, when the predetermined first condition that the driver does not intend to drive the engine 1 is satisfied, the drive of the engine 1 is prohibited even if the first temperature rise condition is satisfied. As a result, the engine 1 is driven at an unintended timing of the driver in order to raise the temperature of the GPF 81, and it is possible to prevent the comfort of the driver from being impaired by the vibration noise caused by the engine drive. In this way, when the first temperature rise condition is satisfied, the engine 1 is driven to raise the temperature of the GPF 81, and the drive of the engine 1 is prohibited while the first condition is satisfied. As a result, the GPF can be regenerated without impairing the comfort of the driver.

Next, when the hybrid vehicle 100 is set to the EV priority running mode that limits the charging by the engine 1, the drive of the engine 1 is prohibited even though the first temperature rise condition is satisfied. As a result, when the vehicle is running in the EV priority running mode in a residential district or the like, the engine 1 is driven at an unintended timing of the driver in order to raise the temperature of the GPF 81, and it is possible to prevent the comfort of the driver from being impaired by the engine driving sound.

When the vehicle speed is equal to or lower than the predetermined speed, the hybrid vehicle 100 prohibits drive of the engine 1 even though the first temperature rise condition is satisfied. The driver is usually not intended to drive the engine 1 during low speed driving. When the engine 1 is driven during the low speed driving, the engine driving sound is more noticeable to the driver. Therefore, when the engine 1 is driven during the low speed driving, the comfort of the driver may be greatly impaired. On the other hand, in the present embodiment, the drive of the engine 1 is prohibited even if the first temperature rise condition is satisfied during the low speed driving. As a result, the engine 1 is driven at an unintended timing of the driver in order to raise the temperature of the GPF 81, and it is possible to prevent the comfort of the driver from being impaired by the engine driving sound.

When the SOC of the battery 3 is greater than the predetermined value $SOC_1$, the hybrid vehicle 100 prohibits the drive of the engine 1 even though the first temperature rise condition is satisfied. When the SOC of the battery 3 is large to some extent (greater than the predetermined value $SOC_1$), the driver does not intend to charge the battery 3, and thus does not intend to drive the engine 1. Therefore, when the engine 1 is driven against the intention of the driver in the case where the SOC is greater than the predetermined value, the comfort of the driver may be impaired. When electric power is generated by the engine 1 in the case where the SOC is large, the allowable charge capacity of the battery 3 may be exceeded. On the other hand, in the present embodiment, when the SOC of the battery 3 is greater than the predetermined value $SOC_1$, the drive of the engine 1 is prohibited even though the first temperature rise condition is satisfied. As a result, the engine 1 is driven at an unintended timing of the driver in order to raise the temperature of the GPF 81, and it is possible to prevent the comfort of the driver from being impaired by the engine driving sound. Further, by driving the engine 1 to raise the temperature of the GPF 81, it is possible to prevent the battery 3 from exceeding the allowable charge capacity and causing troubles to the battery 3.

Second Embodiment

The hybrid vehicle 100 according to a second embodiment will be described with reference to FIGS. 5 and 6. The same elements as those in the first embodiment are denoted by the same reference numerals, and the description thereof will be omitted.

Figure 5:
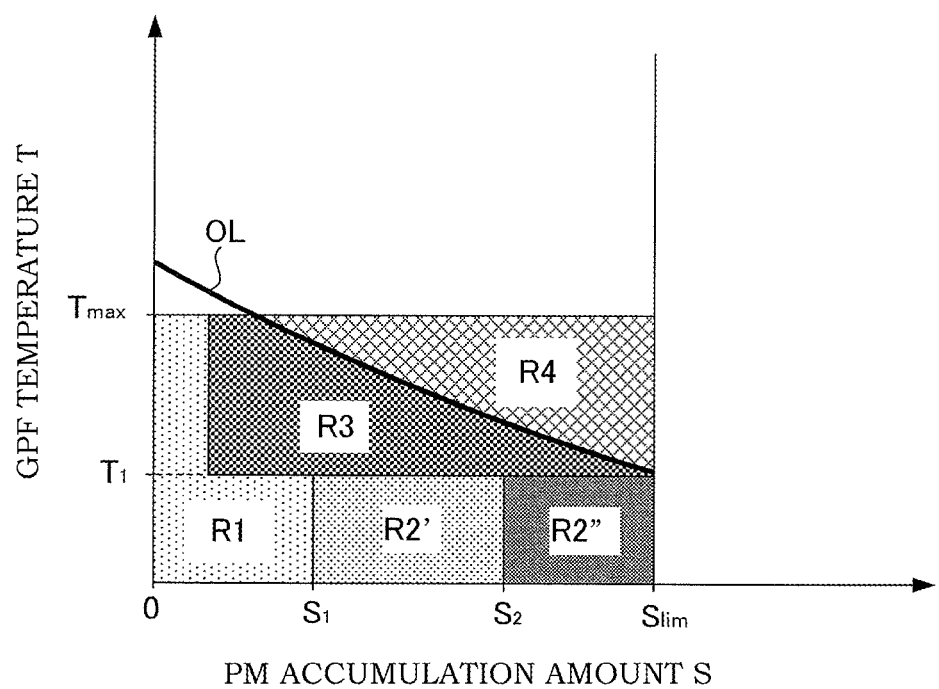
FIG. 5 is a graph illustrating a relation between a GPF temperature, a PM accumulation amount and engine operations in a second embodiment.

FIG. 5 is a graph illustrating a relation between the GPF temperature, the PM accumulation amount and the engine operations in the hybrid vehicle 100 according to the second embodiment. The present embodiment is different from the first embodiment in that the GPF temperature rise region R2 in the first embodiment is divided into a GPF temperature rise region R2' and a GPF forced temperature rise region R2".

In FIG. 5, a region R1 is a normal operation region, the region R2' is the GPF temperature rise region, the region R2" is the GPF forced temperature rise region, the region R3 is the motoring region, and the region R4 is a motoring prohibition region.

As in the first embodiment, in the normal operation region R1, since the PM accumulation amount S accumulated in the filter is small, the engine control for the GPF regeneration is not performed, and the control of the hybrid vehicle 100 is performed in accordance with the set running mode.

When the first predetermined amount $S_1$ or more of PM has been accumulated in the GPF and the GPF temperature is equal to or lower than the predetermined temperature $T_1$, that is, in the GPF temperature rise region R2 where the first temperature rise condition is satisfied, the vehicle controller 10 is configured to drive the engine 1 and raise the temperature of the GPF 81.

When the temperature of the GPF 81 rises to a temperature higher than the predetermined temperature $T_1$, the PM accumulated in the GPF 81 starts burning, and the motoring is performed in the motoring region R3 where the GPF temperature T is higher than the predetermined temperature $T_1$. By the motoring, air is fed into the GPF 81 having a high temperature, the burning of the PM accumulated in the GPF 81 is promoted, and the GPF 81 is regenerated.

On the other hand, as in the first embodiment, when the predetermined first condition that the driver does not intend to drive the engine 1 is satisfied, the vehicle controller 10 prohibits the drive of the engine 1 in the GPF temperature rise region R2'.

However, when the drive of the engine 1 is always prohibited in the case where the first condition is satisfied, the PM accumulation amount S of the GPF 81 may exceed the limit allowable amount $S_{lim}$ while the first condition is still satisfied. Therefore, in the present embodiment, when the PM of a second predetermined amount $S_2$ or more, which is greater than the first predetermined amount $S_1$, is accumulated in the GPF 81 and the GPF temperature is the predetermined temperature $T_1$ or less (hereinafter, referred to as "second temperature rise condition"), that is, in the GPF forced temperature rise region R2" where the second temperature rise condition is satisfied, the vehicle controller 10 is configured to drive the engine 1 even though the predetermined first condition has been satisfied.

When the engine 1 is driven in the GPF forced temperature rise region R2" and the temperature of the GPF 81 rises to a temperature higher than the predetermined temperature $T_1$, the motoring is performed in the motoring region R3. By the motoring, air is fed into the GPF 81 having a high temperature, the burning of the PM accumulated in the GPF 81 is promoted, and the GPF 81 is regenerated.

In this way, by providing the GPF forced temperature rise region R2" in which the temperature of the GPF 81 is more forcibly raised, it is possible to more reliably prevent the PM accumulation amount S of the GPF 81 from exceeding the limit allowable amount $S_{lim}$.

Figure 6:
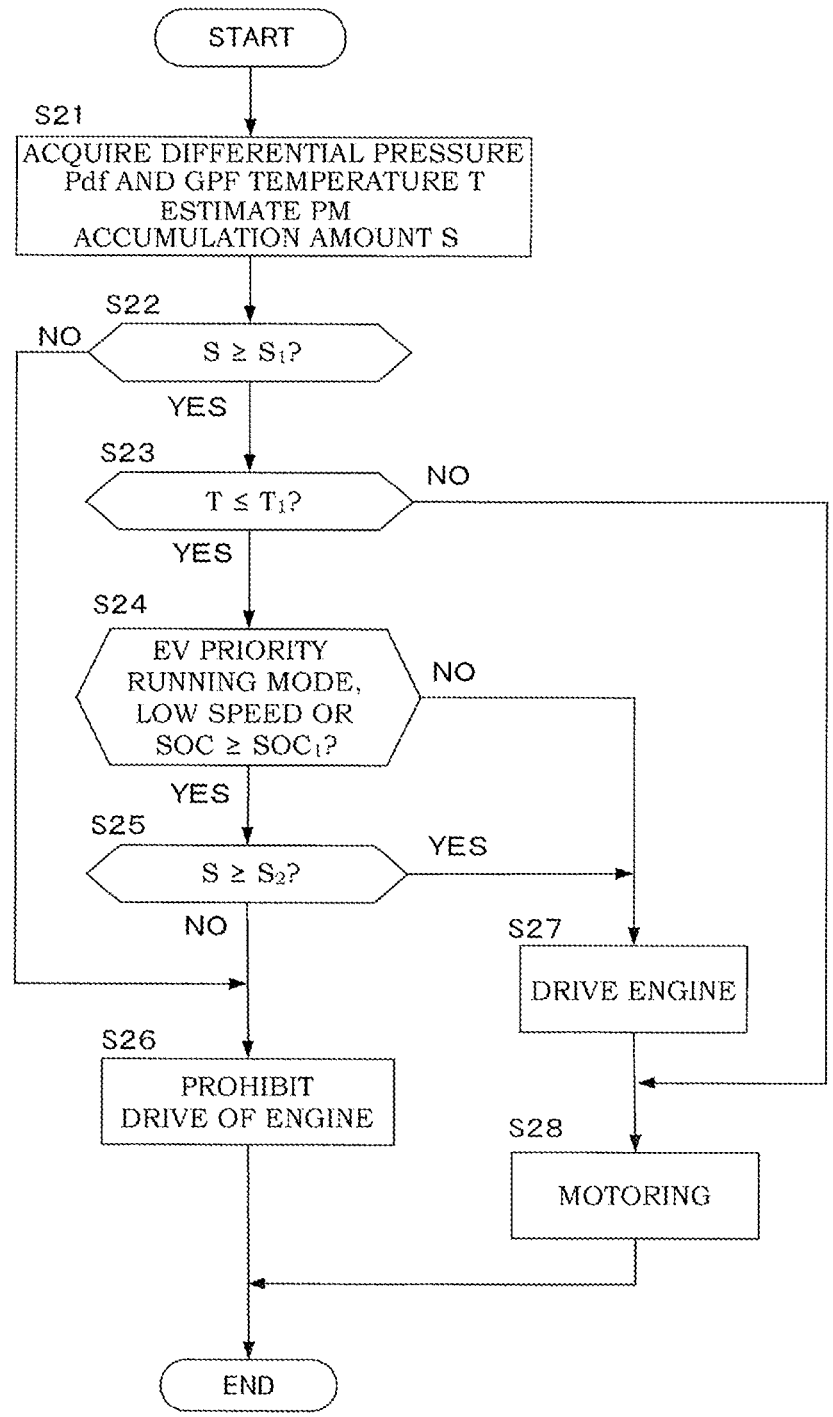
FIG. 6 is a flowchart illustrating engine control based on the GPF temperature and the PM accumulation amount in the second embodiment.

FIG. 6 is a flowchart illustrating the engine control based on the GPF temperature and the PM accumulation amount in the hybrid vehicle 100 of the second embodiment. The following controls are executed by the vehicle controller 10 at regular time intervals.

In step S21, the vehicle controller 10 receives the signal of the differential pressure Pdif and the signal of the GPF temperature T from the GPF system 8, and estimates the PM accumulation amount S of the GPF 81 based on the differential pressure Pdif.

In step S22, the vehicle controller 10 determines whether the PM accumulation amount S is equal to or greater than the first predetermined amount $S_1$. When the PM accumulation amount S is smaller than the first predetermined amount $S_1$, the GPF regeneration is unnecessary, and thus, the vehicle controller 10 proceeds to the process of step S26, and ends the process of the engine control based on the GPF temperature and the PM accumulation amount without driving the engine 1.

On the other hand, when the PM accumulation amount S is equal to or greater than the first predetermined amount $S_1$, the vehicle controller 10 proceeds to the process of step S23, and determines whether the GPF temperature T is equal to or lower than the predetermined temperature $T_1$. When the GPF temperature T is equal to or lower than the predetermined temperature $T_1$, the first temperature rise condition (that is, the PM accumulation amount S is equal to or greater than the first predetermined amount $S_1$ and the GPF temperature T is equal to or lower than the predetermined temperature $T_1$) is satisfied, and the vehicle controller 10 executes the process of step S24.

On the other hand, when the GPF temperature T is higher than the predetermined temperature $T_1$ in step S23, the temperature of the GPF 81 is sufficiently high, and thus the vehicle controller 10 proceeds to the process of step S28 to perform the motoring. When the burning of the PM is promoted, the GPF 81 is regenerated and the differential pressure Pdif becomes equal to or less than the predetermined value by the motoring, the vehicle controller 10 ends the process of the engine control based on the GPF temperature and the PM accumulation amount.

When the first temperature rise condition is satisfied, in step S24, the vehicle controller 10 determines whether the predetermined first condition that the driver does not intend to drive the engine 1 is satisfied. In other words, it is determined whether the EV priority running mode has been set, the vehicle speed is equal to or lower than the predetermined speed, or the SOC of the battery 3 is higher than the predetermined value $SOC_1$, and it is determined that the first condition is satisfied in the case where any one of these conditions has been satisfied. When the first condition is not satisfied, the vehicle controller 10 proceeds to the process of step S27, and drives the engine 1 to raise the temperature of the GPF 81. When the temperature T of the GPF 81 becomes higher than the predetermined temperature $T_1$, the vehicle controller 10 performs the motoring in step S28. When the burning of the PM is promoted, the GPF 81 is regenerated and the differential pressure Pdif becomes equal to or less than the predetermined value by the motoring, the vehicle controller 10 ends the process of the engine control based on the GPF temperature and the PM accumulation amount.

On the other hand, when it is determined in step S24 that the predetermined first condition has been satisfied, the vehicle controller 10 executes the process of step S25. In step S25, the vehicle controller 10 determines whether the PM accumulation amount S is equal to or greater than the second predetermined amount $S_2$. When the PM accumulation amount S is equal to or greater than the second predetermined amount $S_2$, the second temperature rise condition (that is, the PM accumulation amount S is equal to or greater than the second predetermined amount $S_2$ and the GPF temperature T is equal to or less than the predetermined temperature $T_1$) is satisfied. When the PM accumulation amount S is equal to or greater than the second predetermined amount $S_2$ and the second temperature rise condition is satisfied, the vehicle controller 10 proceeds to the process of step S27, and drives the engine 1 to raise the temperature of the GPF 81. When the temperature T of the GPF 81 becomes higher than the predetermined temperature $T_1$, the vehicle controller 10 performs the motoring in step S28. When the burning of the PM is promoted, the GPF 81 is regenerated and the differential pressure Pdif becomes equal to or less than the predetermined value by the motoring, the vehicle controller 10 ends the process of the engine control based on the GPF temperature and the PM accumulation amount.

As described above, when the PM accumulation amount S of the GPF 81 is equal to or greater than the second predetermined amount $S_2$ that is greater than the first predetermined amount $S_1$, the engine 1 is driven to forcibly raise the temperature of the GPF 81 even though the predetermined first condition has been satisfied, and thus it is possible to more reliably prevent the PM accumulation amount S of the GPF 81 from exceeding the limit allowable amount $S_{lim}$.

In step S25, when the PM accumulation amount S of the GPF 81 is smaller than the second predetermined amount $S_2$, the vehicle controller 10 proceeds to the process of step S26, prohibits the drive of the engine 1, and ends the process of the engine control based on the GPF temperature and the PM accumulation amount.

According to the hybrid vehicle 100 of the second embodiment described above, the following effects can be obtained.

The hybrid vehicle 100 drives the engine 1 to raise the temperature of the GPF 81 even if the predetermined first condition is satisfied when the PM of the second predetermined amount $S_2$ or more, which is greater than the first predetermined amount $S_1$, is accumulated in the GPF 81 and the second temperature rise condition that the temperature of the GPF 81 is equal to or lower than the predetermined temperature $T_1$ is satisfied. That is, when a volume amount of the PM is equal to or greater than the second predetermined amount $S_2$, the regeneration of the GPF 81 is prioritized over the comfort of the driver. Thus, it is possible to more reliably prevent the PM accumulation amount S of the GPF 81 from exceeding the limit allowable amount $S_{lim}$.

Third Embodiment

The hybrid vehicle 100 according to the third embodiment will be described with reference to FIG. 7. The same elements as those of the other embodiments are denoted by the same reference numerals, and the description thereof will be omitted.

Figure 7:
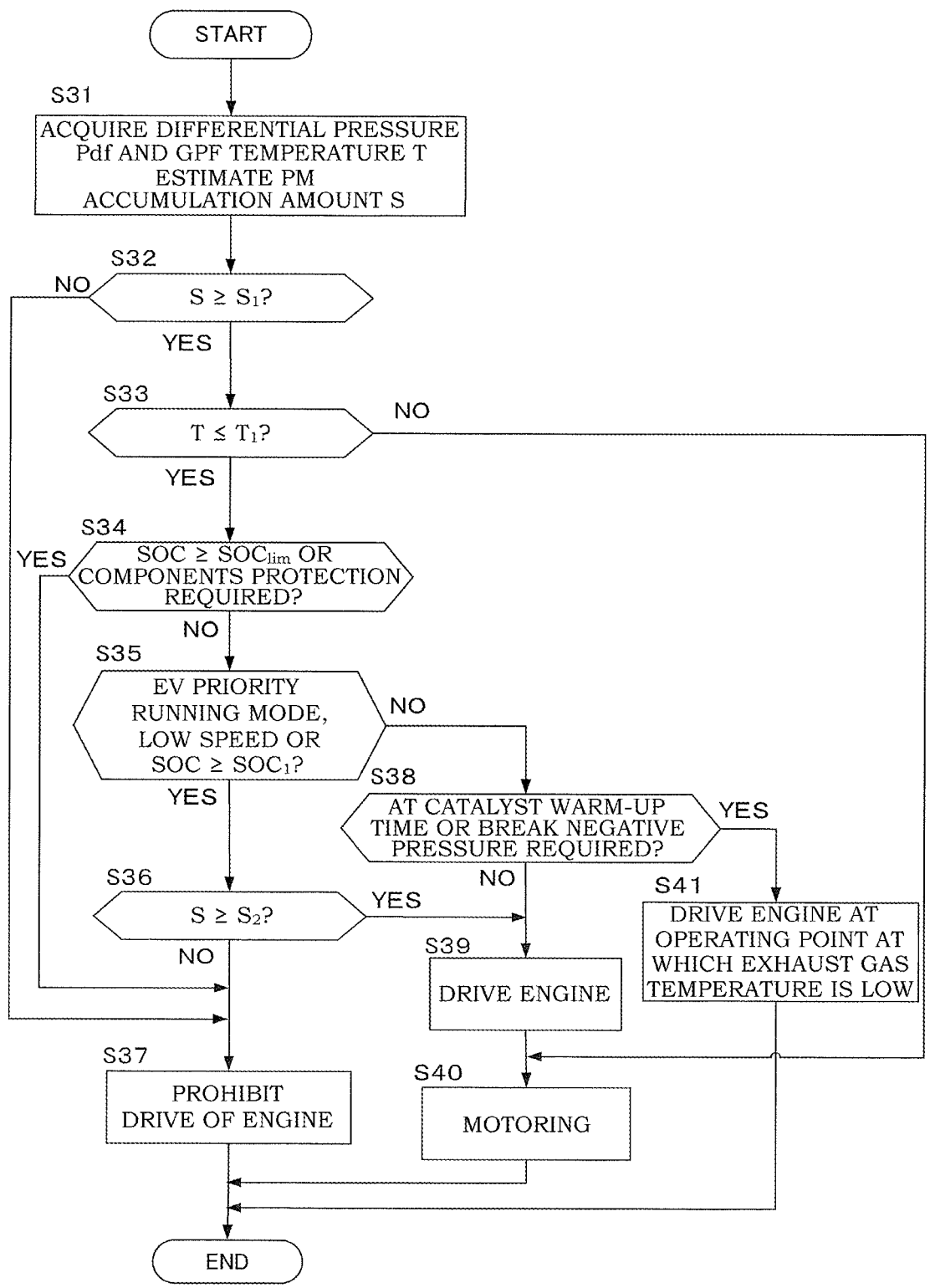
FIG. 7 is a flowchart illustrating engine control according to a GPF temperature and a PM accumulation amount in a third embodiment.

FIG. 7 is a flowchart illustrating the engine control based on the GPF temperature and the PM accumulation amount in a third embodiment. The present embodiment is different from the other embodiments in that the drive of engine 1 is limited when predetermined second conditions that require protection of vehicle components are satisfied, and the engine 1 is operated at an operating point at which the exhaust gas temperature is lower than an operating point at which the temperature of the GPF 81 is raised when a predetermined third condition is satisfied.

In step S31, the vehicle controller 10 receives the signal of the differential pressure Pdif and the signal of the GPF temperature T from the GPF system 8, and estimates the PM accumulation amount S of the GPF 81 based on the differential pressure Pdif.

In step S32, the vehicle controller 10 determines whether the PM accumulation amount S is equal to or greater than the first predetermined amount $S_1$. When the PM accumulation amount S is smaller than the first predetermined amount $S_1$, the GPF regeneration is unnecessary, and thus, the vehicle controller 10 proceeds to the process of step S37, and ends the process of the engine control based on the GPF temperature and the PM accumulation amount without driving the engine 1.

On the other hand, when the PM accumulation amount S is equal to or greater than the first predetermined amount $S_1$, the vehicle controller 10 proceeds to the process of step S33, and determines whether the GPF temperature T is equal to or lower than the predetermined temperature $T_1$. When the GPF temperature T is equal to or lower than the predetermined temperature $T_1$, the first temperature rise condition (that is, the PM accumulation amount S is equal to or greater than the first predetermined amount $S_1$ and the GPF temperature T is equal to or lower than the predetermined temperature $T_1$) is satisfied, and the vehicle controller 10 executes the process of step S34.

On the other hand, when the GPF temperature T is higher than the predetermined temperature $T_1$ in step S33, the temperature of the GPF 81 is sufficiently high, and thus the vehicle controller 10 proceeds to the process of step S40 to perform the motoring. When the burning of the PM is promoted, the GPF 81 is regenerated and the differential pressure Pdif becomes equal to or less than the predetermined value by the motoring, the vehicle controller 10 ends the process of the engine control based on the GPF temperature and the PM accumulation amount.

When the first temperature rise condition is satisfied, in step S34, the vehicle controller 10 determines whether the predetermined second condition that requires protection of vehicle components is satisfied. In other embodiments, the engine 1 is driven when the first temperature rise condition has been satisfied and the predetermined first condition is not satisfied or when the second temperature rise condition is satisfied, but from the viewpoint of protecting the vehicle components, it may be preferable to limit the drive of the engine 1. Therefore, in the present embodiment, it is determined whether a predetermined condition (hereinafter, referred to as the second condition) that requires protection of vehicle components is satisfied, and when the second condition is satisfied, the limitation of the drive of the engine 1 is prioritized over the temperature rise of the GPF 81.

Specifically, in step S34, the vehicle controller 10 determines whether the SOC of the battery 3 is equal to or greater than an allowable charge upper limit value $SOC_{lim}$ that is greater than the predetermined value $SOC_1$, or whether it is necessary to limit the drive of the engine 1 in order to protect the vehicle components. In a case where any one of these conditions has been satisfied, the vehicle controller 10 determines that the second condition is satisfied. The SOC allowable charge upper limit value $SOC_{lim}$ of the battery 3 is set to a value large enough to require discharge. In other words, in the present embodiment, when the SOC of the battery 3 is large and the discharge is required, the drive limitation of the engine 1 is prioritized over the temperature rise of the GPF 81 from the viewpoint of battery protection. The cases where it is necessary to limit the drive of the engine 1 in order to protect the vehicle components refer to cases where when the engine 1 is further driven, there is a possibility that a failure occurs in the engine 1 or other components. For example, this corresponds to a case where a water temperature of the engine cooling water is abnormally high, a case where the throttle is stuck, a case where the temperature of the generator 2 is high and electric power cannot be generated any more, and the like. In the present embodiment, in such cases, the drive limitation of the engine 1 is prioritized over the temperature rise of the GPF 81.

The second condition is not necessarily limited to the above-mentioned cases, and a case other than the above-mentioned cases may be included in the second condition as long as the protection of vehicle components is required.

When the second condition is satisfied in step S34, the vehicle controller 10 proceeds to the process of step S37, and ends the process of the engine control based on the GPF temperature and the PM accumulation amount without driving the engine 1.

In this way, in the present embodiment, regardless of whether the first temperature rise condition or the second temperature rise condition is satisfied, the drive of the engine 1 is prohibited when it is necessary to limit the drive of the engine in order to protect the vehicle components.

On the other hand, when the second condition is not satisfied in step S34, the vehicle controller 10 executes the process of step S35.

In step S35, the vehicle controller 10 determines whether the predetermined first condition that the driver does not intend to drive the engine 1 is satisfied. In other words, it is determined whether the EV priority running mode has been set, the vehicle speed is equal to or lower than a predetermined speed, or the SOC of the battery 3 is higher than the predetermined value $SOC_1$, and it is determined that the first condition is satisfied in the case where any one of these conditions has been satisfied. When the first condition is satisfied, the vehicle controller 10 executes the process of step S36.

In step S36, the vehicle controller 10 determines whether the PM accumulation amount S is equal to or greater than the second predetermined amount $S_2$. When the PM accumulation amount S is equal to or greater than the second predetermined amount $S_2$, the second temperature rise condition is satisfied (that is, the PM accumulation amount S is equal to or greater than the second predetermined amount $S_2$ and the GPF temperature T is equal to or less than the predetermined temperature $T_1$), and the vehicle controller 10 proceeds to the process of step S39 to drive the engine 1. When the temperature of the GPF 81 is raised by the drive of the engine 1 and the temperature T of the GPF 81 becomes higher than the predetermined temperature $T_1$, the vehicle controller 10 performs the motoring in step S40. When the burning of the PM is promoted and the GPF 81 is regenerated by the motoring, the vehicle controller 10 ends the process of the engine control based on the GPF temperature and the PM accumulation amount.

On the other hand, when the predetermined first condition is not satisfied in step S35, the vehicle controller 10 executes the process of step S38.

In step S38, the vehicle controller 10 determines whether the predetermined third condition that causes a trouble in relation to the performance of other components when the engine 1 is operated at the operating point at which the temperature of the GPF 81 is raised is satisfied. When the engine 1 is driven to raise the temperature of the GPF 81, the vehicle controller 10 controls the operation of the engine 1 such that the operating point of the engine 1 determined by engine speed and torque comes to an operating point at which the temperature of the GPF 81 is raised by the exhaust gas of the engine 1. However, when the engine 1 is operated at such an operating point in relation to the performance of other components, a trouble may occur. Therefore, in the present embodiment, it is determined whether the predetermined third condition that causes a trouble in relation to the performance of other components, and when the third condition has been satisfied, the engine 1 is operated at an operating point at which the exhaust gas temperature is lower than the operating point at which the temperature of the GPF 81 is raised even if the first temperature rise condition has been satisfied and the predetermined first condition is not satisfied.

Specifically, in a case corresponding to either catalyst warm-up time or brake negative pressure request time, the engine 1 is operated at an operating point at which the exhaust gas temperature is lower than the operating point at which the temperature of the GPF 81 is raised even if the first temperature rise condition has been satisfied and the predetermined first condition is not satisfied. When the engine 1 is operated at an operating point at which the temperature of the GPF 81 is raised at the catalyst warm-up time, the purification efficiency of the catalyst deteriorates and the exhaust gas volume increases. Therefore, at the catalyst warm-up time, the engine 1 is operated at an operating point at which the exhaust gas temperature is lower than the operating point at which the temperature of the GPF 81 is raised. Although the throttle is controlled to be opened at the operating point at which the temperature of the GPF 81 is raised, it is necessary to increase an intake negative pressure by performing control to close the throttle at the brake negative pressure request time. Therefore, at the brake negative pressure request time, the throttle is closed, and the engine 1 is operated at an operating point at which the exhaust gas temperature is lower than the operating point at which the temperature of the GPF 81 is raised.

In step S38, the vehicle controller 10 determines whether the present is at either the catalyst warm-up time or the brake negative pressure request time, and in either of the two cases, the vehicle controller 10 determines that the third condition is satisfied.

When the predetermined third condition has been satisfied in step S38, the vehicle controller 10 executes the process of step S41.

In step S41, the vehicle controller 10 drives the engine 1 at an operating point at which the exhaust gas temperature is lower than the operating point at which the temperature of the GPF 81 is raised. When the warm-up of the catalyst is completed or the brake negative pressure is not required, the vehicle controller 10 ends the process of the engine control based on the GPF temperature and the PM accumulation amount.

On the other hand, when the predetermined third condition is not satisfied in step S38, the vehicle controller 10 proceeds to the process of step S39, and drives the engine 1 to raise the temperature of the GPF 81. When the temperature T of the GPF 81 becomes higher than the predetermined temperature T 1, the vehicle controller 10 performs the motoring in step S40 and burns the PM. When the PM is burned and the GPF 81 is regenerated, the vehicle controller 10 ends the process of the engine control based on the GPF temperature and the PM accumulation amount.

In the present embodiment, all of the process of step S34 of determining whether the predetermined second condition is satisfied, the process of step S38 of determining whether the predetermined third condition is satisfied, and the process of step S41 of controlling the engine 1 based on the process of step S38 are executed, but only one of the processes of steps S34, S38 and S41 may be executed.

According to the hybrid vehicle 100 of the third embodiment described above, the following effects can be obtained.

The hybrid vehicle 100 prohibits the drive of the engine 1 when the predetermined second condition that requires the protection of the vehicle components is satisfied, even if the first temperature rise condition has been satisfied and the predetermined first condition is not satisfied, or the second temperature rise condition has been satisfied. That is, when the protection of the vehicle components is required, the drive limitation of the engine 1 is prioritized over the regeneration of the GPF 81. Thus, when protection of the components is required, it is possible to prevent the components from being interfered by driving the engine 1 to raise the temperature of the GPF 81.

The hybrid vehicle 100 prohibits the drive of the engine 1 when the SOC of the battery 3 is greater than or equal to the allowable charge upper limit value $SOC_{lim}$, even if the first temperature rise condition has been satisfied and the predetermined first condition is not satisfied, or the second temperature rise condition has been satisfied. Thus, even if the SOC of the battery 3 is large and the discharge is required, it is possible to prevent the battery 3 from being interfered by driving the engine 1 to raise the temperature of the GPF 81.

The hybrid vehicle 100 prohibits the drive of the engine 1 when it is necessary to limit the drive of the engine to protect the vehicle components even if the first temperature rise condition has been satisfied and the predetermined first condition is not satisfied, or the second temperature rise condition has been satisfied. Thus, even in the case where there is a possibility that a failure occurs in the engine 1 or other components when the engine 1 is further driven, it is possible to prevent the engine 1 from being driven to raise the temperature of the GPF 81.

When the first temperature rise condition has been satisfied and the predetermined first condition is not satisfied at the catalyst warm-up time, the hybrid vehicle 100 drives the engine 1 at an operating point at which the exhaust gas temperature is lower than the operating point at which the temperature of the GPF is raised. When the engine 1 is operated at an operating point at which the temperature of the GPF 81 is raised at the catalyst warm-up time, the purification efficiency of the catalyst deteriorates and the exhaust gas volume increases. On the other hand, in the present embodiment, the engine 1 is driven at an operating point at which the exhaust gas temperature is low at the catalyst warm-up time. As a result, the purification efficiency of the catalyst can be prevented from deteriorating, and the exhaust gas volume can be prevented from increasing.

When the first temperature rise condition has been satisfied and the predetermined first condition is not satisfied at the brake negative pressure request time, the hybrid vehicle 100 drives the engine 1 at an operating point at which the exhaust gas temperature is lower than the operating point at which the temperature of the GPF is raised. Although the engine 1 is controlled to open the throttle at the operating point at which the temperature of the GPF 81 is raised, it is necessary to increase an intake negative pressure by performing control to close the throttle at the brake negative pressure request time. Therefore, when the engine 1 is driven at the operating point at which the temperature of the GPF 81 is raised even if the brake negative pressure is required, the necessary brake negative pressure cannot be obtained. On the other hand, in the present embodiment, the engine 1 is driven at an operating point at which the exhaust gas temperature is low at the brake negative pressure request time. As a result, it is possible to ensure the necessary brake performance at the brake negative pressure request time.

In any of the embodiments, the control of prohibiting the drive of the engine 1 even if the first temperature rise condition is satisfied, when the predetermined first condition has been satisfied, has been described, but similarly, the motoring may be controlled to prohibit the motoring operation when a predetermined condition is satisfied. For example, in a case where the comfort of the driver is impaired by the motoring, the control may be performed such that the motoring is prohibited even if the state point in FIGS. 3 and 5 is in the motoring region R3.

In the second and third embodiments, it has been described that when the second temperature rise condition has been satisfied, the engine 1 is more forcibly driven, but as for the motoring, when the PM accumulation amount exceeds the predetermined amount, the control may be performed to forcibly operate the motoring.

Although the embodiments of the invention have been described above, the above-mentioned embodiments are only a part of application examples of the invention, and does not mean that the technical scope of the invention is limited to the specific configurations of the above-mentioned embodiments.

Each of the embodiments described above has been described as a single embodiment, but the embodiments may be appropriately combined.

The invention claimed is:

1. A control method for a hybrid vehicle comprising a generator configured to charge a battery by using power of an engine, an electric motor configured to drive a driving wheel by electric power of the battery, and a particulate filter configured to collect particulate matter contained in exhaust gas from the engine, the control method comprising:

driving the engine to raise a temperature of the particulate filter when a first temperature rise condition is satisfied in which a first predetermined amount or more of the particulate matter is accumulated in the particulate filter and the temperature of the particulate filter is equal to or lower than a predetermined temperature, prohibiting drive of the engine, even if the first temperature rise condition is satisfied, when a predetermined first condition that a driver does not intend to drive the engine is satisfied, and driving the engine to raise the temperature of the particulate filter, even if the predetermined first condition is satisfied, when a second temperature rise condition is satisfied in which a second predetermined amount or more of the particulate matter which is greater than the first predetermined amount is accumulated in the particulate filter and the temperature of the particulate filter is equal to or lower than the predetermined temperature.

2. The control method for a hybrid vehicle according to claim 1, wherein the predetermined first condition is any one of a condition that the hybrid vehicle is set to an EV priority running mode in which charging by the engine is limited, a condition that a vehicle speed is equal to or lower than a predetermined speed, and a condition that an SOC of the battery is greater than a predetermined value.

3. The control method for a hybrid vehicle according to claim 1, further comprising:

prohibiting the drive of the engine when a predetermined second condition that requires protection of vehicle components is satisfied, even if the first temperature rise condition is satisfied and the predetermined first condition is not satisfied.

4. The control method for a hybrid vehicle according to claim 1, further comprising:

prohibiting the drive of the engine when a predetermined second condition that requires protection of vehicle components is satisfied, even if the second temperature rise condition is satisfied.

5. The control method for a hybrid vehicle according to claim 3 wherein the predetermined second condition is any one of a condition that an SOC of the battery is equal to or higher than an allowable charge upper limit value, and a condition that it is necessary to limit the drive of the engine in order to protect the vehicle components.

6. The control method for a hybrid vehicle according to claim 1 further comprising:

driving the engine at an operating point at which an exhaust gas temperature is lower than an operating point at which the temperature of the particulate filter is raised when the first temperature rise condition is satisfied and the predetermined first condition is not satisfied at catalyst warm-up time or at brake negative pressure request time.

7. A controller for a hybrid vehicle comprising a generator configured to charge a battery by using power of an engine, an electric motor configured to drive a driving wheel by electric power of the battery, and a particulate filter configured to collect particulate matter contained in exhaust gas from the engine, the controller configured to:

drive the engine to raise a temperature of the particulate filter when a first temperature rise condition is satisfied in which a first predetermined amount or more of the particulate matter is accumulated in the particulate filter and the temperature of the particulate filter is equal to or lower than a predetermined temperature;

prohibit drive of the engine when a predetermined first condition that a driver does not intend to drive the engine is satisfied; and drive the engine to raise the temperature of the particulate filter, even if the predetermined first condition is satisfied, when a second temperature rise condition is satisfied in which a second predetermined amount or more of the particulate matter which is greater than the first predetermined amount is accumulated in the particulate filter and the temperature of the particulate filter is equal to or lower than the predetermined temperature.

* * * * *